United States Patent Office 3,351,083
Patented Nov. 7, 1967

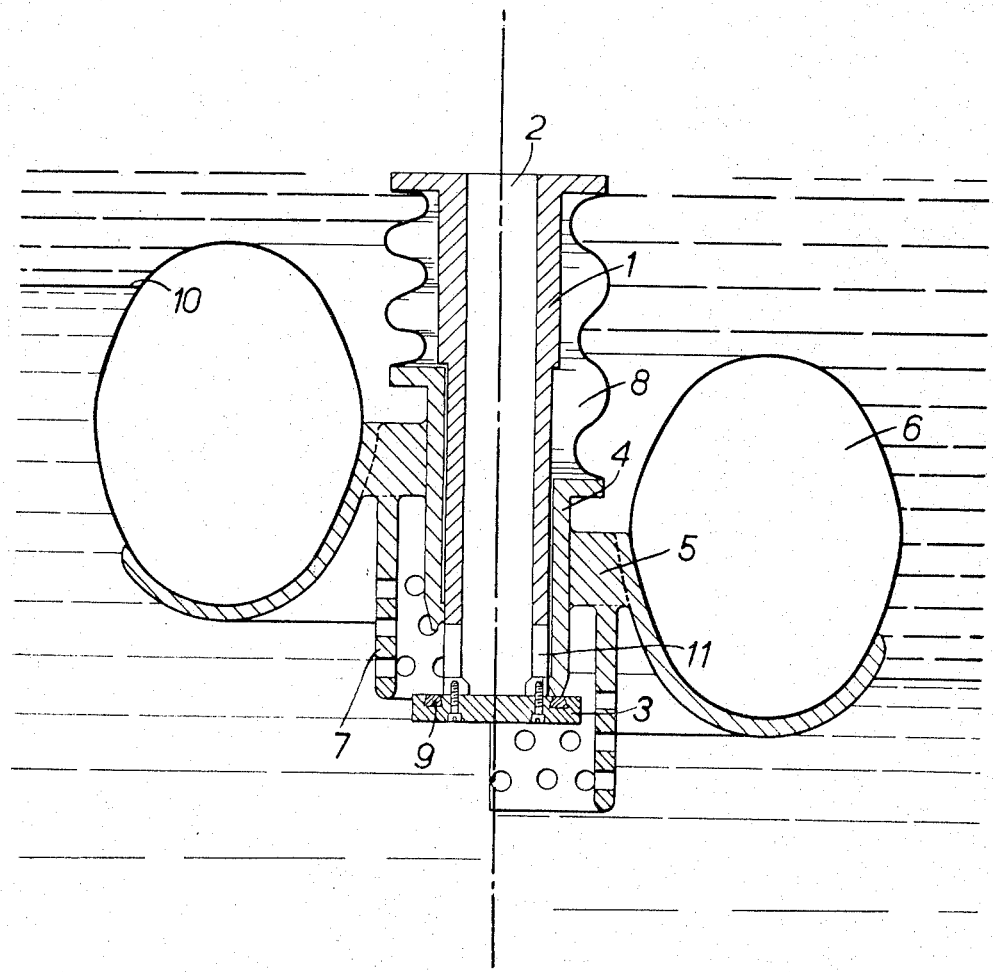

3,351,083
FLOAT VALVE
Peter Alfred Sait, Twickenham, Middlesex, England, assignor to Esso Research and Engineering Company, a corporation of Delaware
Filed Mar. 24, 1965, Ser. No. 442,442
Claims priority, application Great Britain, Mar. 26, 1964, 12,920/64
1 Claim. (Cl. 137—399)

ABSTRACT OF THE DISCLOSURE

A float valve, riding at the interface of immiscible liquids of different densities, includes an apertured tube closed at one end, over which slides a sleeve to cover and uncover the tube apertures. A float is attached to the sleeve and a bellows is attached at one end to the sleeve and, at the other end, to the open end of the tube. A perforated skirt surrounds and depends below the end of the tube to act as a strainer and turbulence reducer for the fluid entering the tube when the float is in a raised position.

This invention relates to a float valve adapted to operate in response to the raising or lowering of an interface between two immiscible liquids of differing density.

The valve according to the invention may be adapted to operate in response to such an interface to allow lighter liquid to be drawn off when the interface reaches a predetermined level. It is particularly suitable, however, cutting off the flow of a relatively heavy liquid, such as water, when a water/oil interface reaches a predetermined level. Such an operation may be carried out in discharging water from an oil-tanker cargo space, after cleaning out the cargo spaces with water jets, resulting in a volume of water and oil slop being contained in the resulting cargo space.

According to the invention, there is provided a float valve comprising a tube having a closed end, fluid outlets in the wall of the tube, adjacent to the closed end, a sleeve slideably mounted on the tube and adapted to move from an intermediate position to a gating position over the fluid outlets, float means mounted on the sleeve, and a bellows attached to the tube and sleeve and adapted to prevent ingress of fluid between the tube and sleeve when the sleeve is in the gating position.

An embodiment of the invention will now be described by way of example with reference to the accompanying drawing, which illustrates a vertical cross-section of a valve responsive to the movement of an oil/water interface, one-half of the drawing showing the valve in the open position, and the other half showing the valve in the gating or closed position.

Referring to the drawing, a centrally disposed tube 1 has an open end and a closed end sealed by plate 3. Fluid outlets 11 are provided adjacent the closed end of the tube 1. A sleeve 4 is slideably mounted on the tube 1. Flange portions 5 secured to the sleeve have a doughnut-shaped float 6 mounted thereon. A perforated skirt 7 is secured to the sleeve 4 to reduce turbulence and to prevent the entrainment of solid matter during passage of liquid through the fluid outlets 11. An oil-resistant bellows 8 is joined to the open end of the tube and the sleeve 4. Sealing surfaces 9 are provided in the closure plate 3 to contact the sleeve 4 when in the gating position to prevent ingress of fluid between the sleeve 4 and tube 1.

Operation of the valve illustrated is obtained by placing the valve at a predetermined level at which the oil/water interface is to be stabilised. When the oil/water interface 10 is at a level above the predetermined level, the float holds the sleeve in an open position, as shown in the left-hand side of the drawing, allowing water to be drawn away by pumping or siphon means not shown, whereby the oil/water interface is lowered. When the oil/water interface drops below the predetermined level, the combined weight of the sleeve and float, taking into account the calculated buoyancy of the float, is such that the float drops to a gating position as shown on the right-hand side of the drawing, whereby further pumping of water from the closed cargo space is prevented.

The embodiment shown in the drawing could easily be inverted for use in a situation in which oil is drawn off instead of water.

What is claimed is:

A float valve for maintaining a liquid in a container at a predetermined level comprising, a tubular member arranged to be located in a substantially vertical position with a lower end submerged in the liquid at or slightly below said predetermined level, fluid inlet means adjacent the lower end of said tubular member, plate means closing the lower end of said tubular member and extending outwardly beyond the outside diameter thereof to form a circular valve seat thereabout, a sleeve surrounding said tubular member and arranged to be axially slidable thereon, said sleeve including a lower annular portion for contacting said valve seat, annular float means having an elliptical cross-section responsive to the level of the liquid in said container secured by an annular flange to and surrounding said sleeve, and an annular skirt secured to said flange between the float and sleeve and having a plurality of apertures therethrough, said skirt being of a diameter larger than said plate means for permitting said skirt to surround and depend below said plate means when said float valve is in a closed position and for acting as a strainer and turbulence reducer for fluid entering said fluid inlet means when said float valve is in an open position, and a tubular bellows secured at one end to the upper portion of said tubular member and at the opposite to said sleeve for preventing leakage of liquid between said sleeve and tubular member.

References Cited

UNITED STATES PATENTS

| 1,155,576 | 10/1915 | Isley | 251—335.2 X |
| 1,201,558 | 10/1916 | Cobb | 137—172 X |
| 2,116,505 | 5/1938 | Burton | 137—432 X |

FOREIGN PATENTS

| 1,108,067 | 8/1955 | France. |
| 1,032,995 | 6/1958 | Germany. |

ALAN COHAN, *Primary Examiner.*